Jan. 13, 1948.     E. H. CARRUTHERS     2,434,607
EXPANSIBLE AND CONTRACTIBLE MEANS FOR COMPRESSING
AND SHAPING A YIELDING PLIANT MASS
Filed Nov. 23, 1942
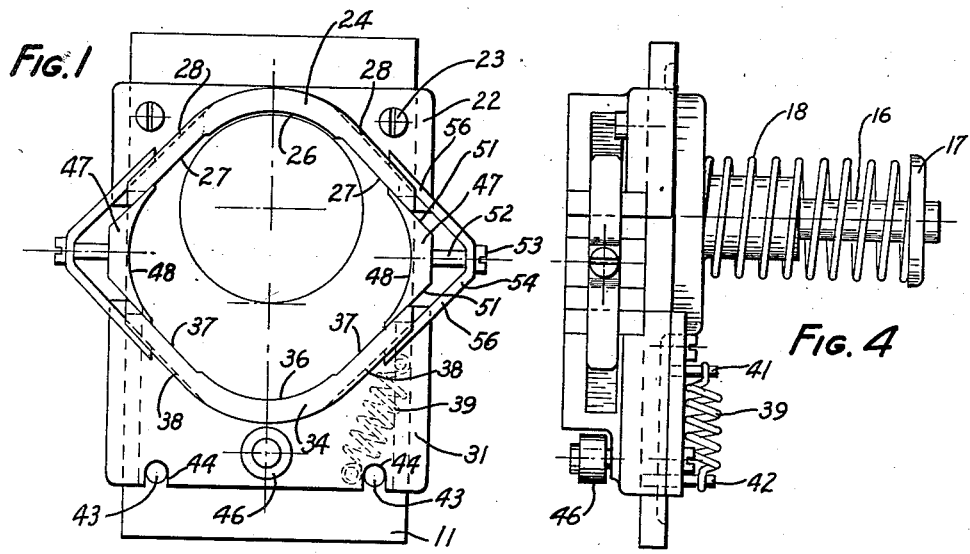
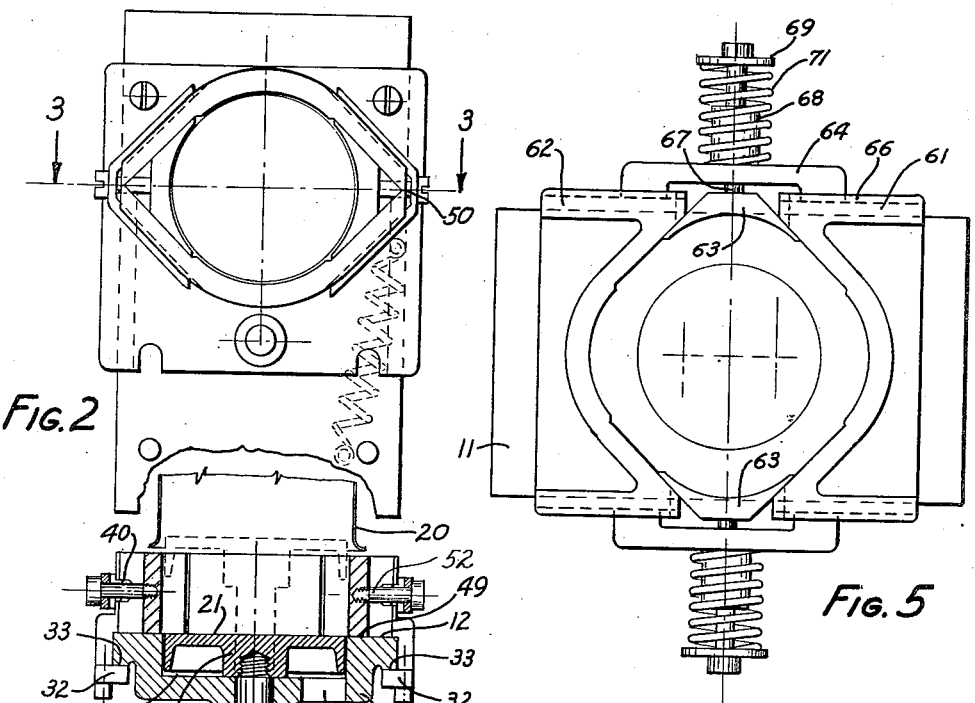
INVENTOR
EBEN HUNTER CARRUTHERS
BY
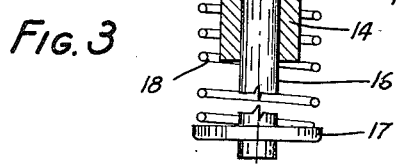
ATTORNEY Patented Jan. 13, 1948

2,434,607

UNITED STATES PATENT OFFICE 2,434,607

EXPANSIBLE AND CONTRACTIBLE MEANS FOR COMPRESSING AND SHAPING A YIELDING PLIANT MASS

Eben Hunter Carruthers, Ithaca, N. Y.

Application November 23, 1942, Serial No. 466,697

6 Claims. (Cl. 226—101)

My invention relates to expansible and contractible means or what might be termed a chucking device. While the chucking device of my invention may have other uses, the apparatus has been designed particularly for use in the compacting and shaping of a plurality of somewhat pliant articles so that they may be shaped and conformed to a can or other container for the purposes of packing the articles.

Reference is made to my copending applications Serial No. 398,460, filed June 17, 1941, and since abandoned, and Serial No. 444,510, filed May 26, 1942, both entitled Method and apparatus for selectively packing products of variable weight.

In the above mentioned applications I have shown and described a method and machine adapted to sort a plurality of articles of variable weight; and select from the sorted articles a plurality of articles whose combined weight equals substantially the desired weight to be packed in a can or other container. The machine of the above mentioned applications also includes an expansible and contractible device in which the selected somewhat pliant pieces are placed so as to be shaped and compacted for the purpose of conforming the mass of articles to the shape of the can or container which they are to occupy, together with means for transferring the shaped and compacted articles to the cans.

The present invention relates to improvements in the expansible and contractible device or the conforming and shaping apparatus of the above mentioned applications. While the present invention may have other uses, it has been particularly designed for use in the packing of tuna or other materials which are more or less yielding and pliant so that the mass formed by the plurality of pieces may be pressed, shaped and conformed to the container which they are to occupy.

An object of my invention is to provide an expansible and contractible device or chucking apparatus, of simple construction, which is particularly suited to conform and shape a pliant mass so that it may be packed in a can or other container.

Another object of my invention is to provide a shaping and conforming apparatus capable of conforming a plurality of pieces of tuna to the shape of a can or other container without the necessity of placing the pieces of tuna in any particular manner within the shaping and conforming apparatus.

My invention further contemplates the provision of a chucking device having two opposed jaws or article engaging surfaces which are movable relative to each other to and from a contracted position, together with a second pair of jaws or article engaging surfaces which are also movable toward and from a contracted position under the control of and regulated by the first mentioned jaws to thus provide an expansible and contractible device which acts with equal force on all sides of the mass so as to properly and accurately shape the mass and condition it for delivery to a can or other container.

Other objects and advantages of my invention will be particularly pointed out in the claims and will be apparent from the following description, when taken in connection with the drawings, in which:

Fig. 1 is a plan view of the expansible and contractible device of my invention with the jaws thereof in expanded position;

Fig. 2 is a view similar to Fig. 1 with the jaws in a contracted position;

Fig. 3 is a view taken substantially on the line 3—3 of Fig. 2;

Fig. 4 is a side elevation of the device of my invention with the jaws in an expanded position;

Fig. 5 is a view similar to Fig. 1 showing a somewhat modified form of the invention.

As described in the above mentioned copending applications, present practices in packing tuna are laborious and time consuming. The workers in packing tuna attempt to select a plurality of pieces by judgment alone which approximate the size and weight of tuna desired to be placed in the can. For example, the worker selects two pieces of tuna and places them in the can and then attempts to select a third piece which will fill the unoccupied space in the can. In performing this operation pieces of tuna are broken and a considerable amount of scrap results which must be sold at an appreciable discount. In addition, the pieces must be placed in the cans in such manner that the natural grain structure of the fish conforms to the circular shape of the can. That is, in placing the pieces of fish in the can the outer circumference of the pieces must be placed adjacent the inner circular side wall of the can and any deflection of the piece of fish necessary to conform the piece to the curvature of the can must be in a direction such as to increase the curvature of the grain structure. If this is not done the piece of fish is likely to break up.

It will be appreciated that the above hand process is laborious, wasteful and costly. One of the important aspects of my invention is that I have devised an expansible and contractible device or a shaping and forming apparatus suitable for use, for example, in the packing of tuna which enables the operator to place the fish in the apparatus in any convenient manner without regard to the grain structure of the pieces and the apparatus, upon being actuated to contracted position, will shape and conform the mass without breaking the pieces of the mass into shreds. Moreover, the apparatus of my invention produces a more solid and better appearing pack than can be accomplished by hand.

The apparatus of my invention, as shown in Fig. 1. comprises a fixed member or support 11 which has a flat surface 12 planar substantially throughout its extent. Formed in the support 11 is a circular recess 13, the diameter of which is substantially that of the can or other container in which the food product is to be packed. The support has an opening 15 communicating with the recess for the drainage of oil or other liquids which may be pressed from the fish. Extending beneath the support is a boss 14 in which a plunger rod 16 is slidably mounted. As shown most clearly in Fig. 4, the rod has rigidly secured thereto a backing plate 17 which serves as a support for a spring 18. The spring 18 which extends concentric with the boss 14 normally urges the rod in a direction away from the support.

Threaded or attached in any suitable manner to the upper end of the rod 16 is a plunger 19 which fits within the recess 13 so that its upper surface 21 lies substantially flush with the plane of the flat surface 12 of the support. The plunger 19 is preferably of a diameter slightly less than that of the can or other container in which the fish is to be packed as it is desirable that the plunger shall slightly enter the mouth of the can during the transfer of the food product from the chucking apparatus to the can 20 as illustrated in Fig. 3.

Mounted on the support 11 is a fixed plate 22 which is held in position with respect to the support by means of screws 23. Carried by or integral with the plate 22 is one jaw 24 or product engaging element of a chuck or expansible and contractible device for conforming and shaping the mass of product prior to transfer to the cans. The jaw 24 has a surface 26 which is formed on the arc of a circle slightly less than that of the inner diameter of the can which the food product is to occupy. The cylindrically shaped surface 26 is normal to the planar surface 12 and is in such fixed position that it is concentric with although formed on a diameter slightly larger than the diameter of the plunger 21.

The jaw 26 on its inner side is provided with flat planar surfaces 27 which also are normal to the plane of the surface 12. The surfaces 27 lie slightly outside of a tangent to the cylindrical surface 26. On the outer sides of the jaw 24 a pair of rectangular elongated recesses or grooves 28 are provided, the purpose of which, together with the surfaces 27, will later appear.

Mounted on the support 11 is a slide 31 which has depending and inwardly extending side edges 32 as shown in Fig. 3 in sliding engagement with surfaces 33 which act as ways for the slide. The slide 31 carries a jaw 34 which lies opposite to and is a counterpart of the jaw 24. The jaw 34 has a cylindrical shaped surface 36, flat surfaces 37, and grooves 38 all corresponding to the corresponding elements 26, 27 and 28 of the jaw 24.

A spring 39 (or a pair of springs) having one end secured, as shown at 41, to the slide and the other end, as shown at 42, secured to the support normally retains the jaws 24 and 34 of the chuck in a separated position, as shown in Fig. 1. Stops 43 mounted on the support are adapted to register with the margins of grooves 44 to limit the movement of the slide 31 under the influence of the spring 39.

Any suitable means may be provided for actuating the slide 31 so as to close the chuck against the action of the spring. Such means may comprise a roller 46 mounted on the slide 31 and adapted to be actuated by a cam (not shown). The timing of the closing of the clutch may be automatic or may be under the control of the operator as desired. In one form of apparatus in which my invention may be employed the cans may be carried by a suitable conveyer operating above the chuck with the cans depending with their open ends downward. The cam, not shown, may then actuate the slide 31 in timed sequence with the feeding of the cans so as to close the chuck and shape and compress the mass. Moreover, the plunger 19 may also be operated in timed relation with the conveyer so as to press or force the mass out of the chuck and into the depending open mouth of a can at the proper time.

Lying between the jaws 24, 34 and adapted to be supported thereby are a pair of jaws or shoes 47 which have article engaging surfaces 48. The article engaging surfaces 48 are formed on the arc of the same circle as the cylindrical surfaces 26 and 36. The bottom surfaces of the shoes 47, as shown at 49 in Fig. 3, slide on the planar surface 12. Planar surfaces 51 are formed of the rearward faces of the shoes 47 and are adapted to engage and slide on the surfaces 27 and 37.

A bolt 52 is threaded into each of the shoes 47, as shown in Fig. 3, and the head 53 thereof serves to confine a V-shaped element 54. Each of the V-shaped elements 54 has a pair of spring arms 56 which are slidable in the grooves 28 and 38. These spring arms have considerable rigidity but are light enough to have a slight amount of give or spring thereby keeping the jaws or shoes 47 in tight yielding contact with the surfaces 27 and 37 regardless of any slight out of parallelism of the sliding surfaces. The ends of the jaws 24 and 34 are provided with cut-outs 40 to permit straddling of the bolts 52 so that the ends of the jaws may engage each other.

It will now be appreciated that when the slide 31 is actuated that the jaw 34 will move from the position shown in Fig. 1 to that shown in Fig. 2. Simultaneously the surface 51 will slide with respect to the surfaces 27 and 37 and the spring arms 56 will slide in the grooves 28 and 38 so as to move the parts from the position shown in Fig. 1 to that shown in Fig. 2. Thus the actuation of the jaws or shoes 47 is under the control of the slide 31. Since the jaw 34 is brought into fixed relationship with respect to the jaw 24 by engagement of the ends of the jaws at 50, the shoes 47 are correspondingly brought into fixed relationship with each other and with respect to the other parts. The surfaces 26, 36 and 48 thus form a substantially complete cylinder about the mass of tuna or other product being packed.

With this arrangement the jaws and shoes can not get out of alignment and are brought into exact concentric registry with the plunger 21. Not only are the shoes controlled and guided by the jaws but also the jaws tend to maintain the slide parallel to its ways. Moreover, the pliant yielding mass of pieces of fish is pressed substantially equally from all sides so as to properly shape and conform the mass as desired. It will be appreciated that by reason of the fact that the pieces of fish have been previously weighed and selected so as to provide a predetermined desired weight of fish that the mass is such that it can be shaped and conformed to the size of the can without creating undue stresses in the mass which would be likely to cause breakage of the pieces or undue bulging of the mass above the upper edges of the jaws.

As previously mentioned, it is desirable that the mass be conformed to a diameter slightly less than that of the can so that when the plunger is actuated the force thereof will press the material out of the chuck and into the can without the possibility of the mass engaging the lip of the can. Moreover, the plunger enters the mouth of the can 20 slightly, as illustrated, so as to press the mass into the bottom thereof. When the plunger has been withdrawn the mass is free to expand slightly to fill the entire cross sectional area of the can.

In Fig. 5 I have shown a modified form of my invention wherein the support 11 has mounted thereon two sliding jaws 61 and 62 instead of one sliding and one fixed jaw. The sliding jaws 61 and 62 may be actuated in any suitable manner (not shown) and serve to actuate shoes or jaws 63 in the same manner as the shoes 47 of Fig. 1. The shoes are held in position by arms 64 which are slidable in grooves 66 formed at the sides of the jaws 61 and 62. A rod 67 threaded into each of the shoes 63 extends freely through the arms 64 and through a boss 68 and is provided with a spring backing plate 69. Springs 71 are confined by the backing plate 69 so as to urge the shoes 63 normally in a direction away from each other. Thus the springs 71 tend to separate the jaws 61 and 62 and hold them in the retracted position shown in Fig. 5. The operation of this device is essentially the same as that previously described. A plunger lying below the support 11 is in alignment with the cylinder formed by the cylindrical surfaces of the jaws 61, 62, and 63 and is actuated either under manual control or automatically to press the mass out of the chuck and into the can after the mass has been properly shaped and conformed to the contour of the can.

While I have described the preferred forms of my invention, it will be apparent that various changes and modifications may be made therein, particularly in the form and relationship of parts, without departing from the spirit of my invention as set forth in the appended claims.

I claim:

1. A mechanism adapted to act upon a yielding pliant mass so that the mass may be shaped and compressed to fit a container of circular section comprising, in combination, a support, means carried by the support for compressing and shaping the mass to a diameter slightly less than that of the container, said means comprising a pair of compressing and shaping members one of which is fixed and the other of which is movable with respect to the support supplemental compressing and shaping elements actuated by said movable member for forming a complete circle about the mass, and means carried by the support for transferring the mass while it is in a shaped and compressed condition from said compressing and shaping means to the container.

2. A mechanism adapted to act upon a yielding pliant mass so that the mass may be shaped and compressed to fit a container of circular section comprising, in combination, a support, means carried by the support for compressing and shaping the mass to a diameter slightly less than that of the container, said means comprising a pair of compressing and shaping members both of which are slidable with respect to the support supplemental compressing and shaping elements actuated by said movable member for forming a complete circle about the mass, and means carried by the support for transferring the mass while it is in a shaped and compressed condition from said compressing and shaping means to the container.

3. An expansible and contractible device of the character described comprising, in combination, a pair of opposed members having object engaging surfaces, means enabling movement of said members relative to each other to and from an object engaging position, a pair of opposed elements having object engaging surfaces and lying between said opposed members, said members and elements having cooperating sliding surfaces with each of said elements sliding upon each of said members, the movement of said elements to and from an object engaging position being controlled by said members, and means for maintaining said sliding surfaces in engagement with each other both when said members are in an object engaging position and when out of said position.

4. Mechanism adapted to act upon a yielding pliant mass so that the mass may be shaped and compressed to fit a container of circular section comprising, in combination, a support, means carried by the support for compressing and shaping the mass to a diameter slightly less than that of the container, said means comprising a pair of compressing and shaping members, means for moving said members relative to each other into and out of mass engaging position, supplemental compressing and shaping elements actuated by at least one of said members for forming a complete circle about the mass, and means carried by the support for transferring the mass while it is in a shaped and compressed condition from said compressing and shaping means to the container.

5. An expansible and contractible device of the character described comprising, in combination, at least four members each having a wall with portions of each of said walls being formed on the arc of substantially the same circle, means for moving said members relative to each other to and from an object engaging position with the circular portions of said wall when in object engaging position forming a complete substantially unbroken circle about the object and said members when out of object engaging position forming a continuous unbroken wall about the object with portions of said wall being formed by the arcuate portions of said members.

6. An expansible and contractible device of the character described comprising, in combination, at least four members each having a wall with portions of each of said walls being formed on the arc of substantially the same circle, means for moving said members relative to each other to and from an object engaging position with the circular portions of said wall when in object engaging position forming a complete substantlaliy unbroken circle about the object, said members when out of object engaging position forming a continuous unbroken wall about the object with portions of said wall being formed by the arcuate portions of said members, a support upon which said members are movable and a plunger carried by said support, said plunger being in alignment with said circle when said circle has been formed.

EBEN HUNTER CARRUTHERS.

REFERENCES CITED

The following references are of record in the file of this patent:

UNITED STATES PATENTS

| Number | Name | Date |
|---|---|---|
| 1,296,092 | Kroeger | Mar. 4, 1919 |
| 1,455,013 | Anderson | May 15, 1923 |
| 2,112,872 | Wilson | Apr. 15, 1938 |
| 1,909,604 | Bailor | May 16, 1933 |
| 1,803,608 | Goetz et al. | May 5, 1931 |
| 1,659,783 | Pearce | Feb. 21, 1928 |
| 2,044,813 | Rooney | June 23, 1936 |
| 2,401,728 | Gillette et al. | June 11, 1946 |